Nov. 24, 1931. P. J. MARCHAUT 1,833,613
PRESSURE CONTROLLING MEANS FOR COMPRESSORS
Filed April 20, 1929
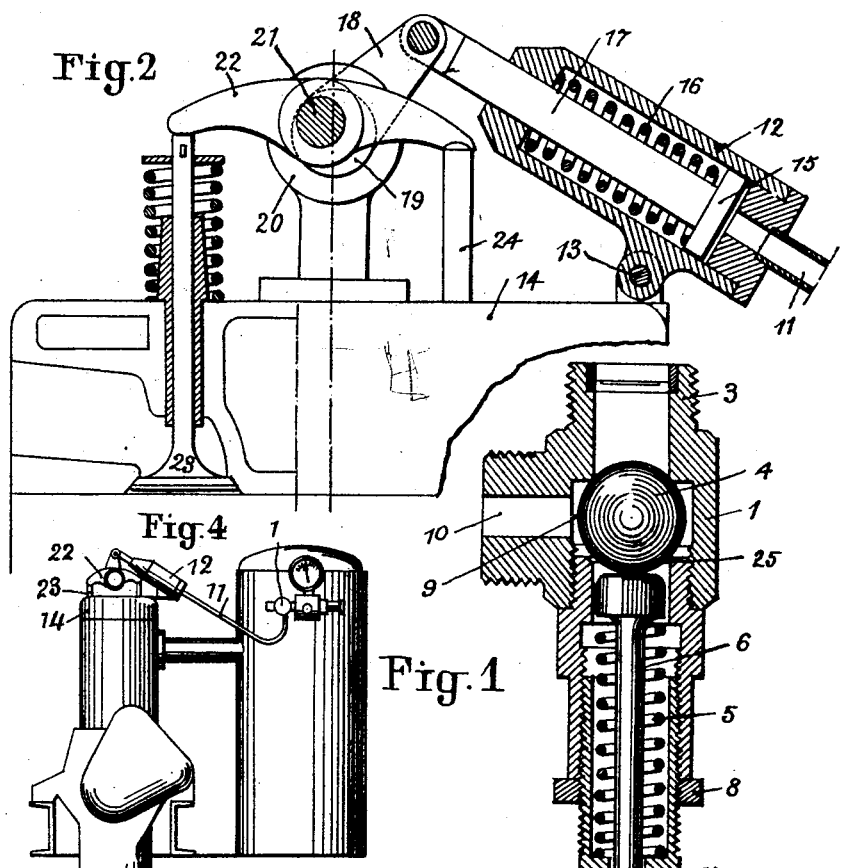
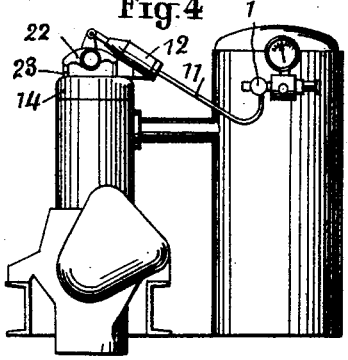
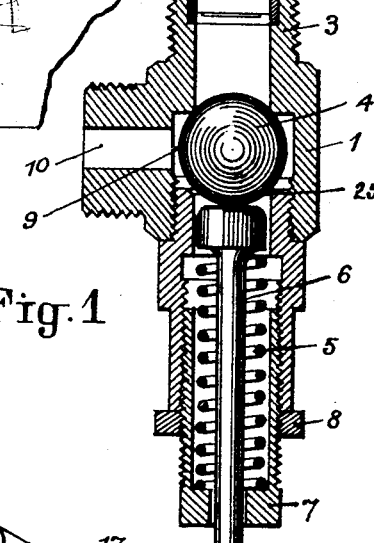
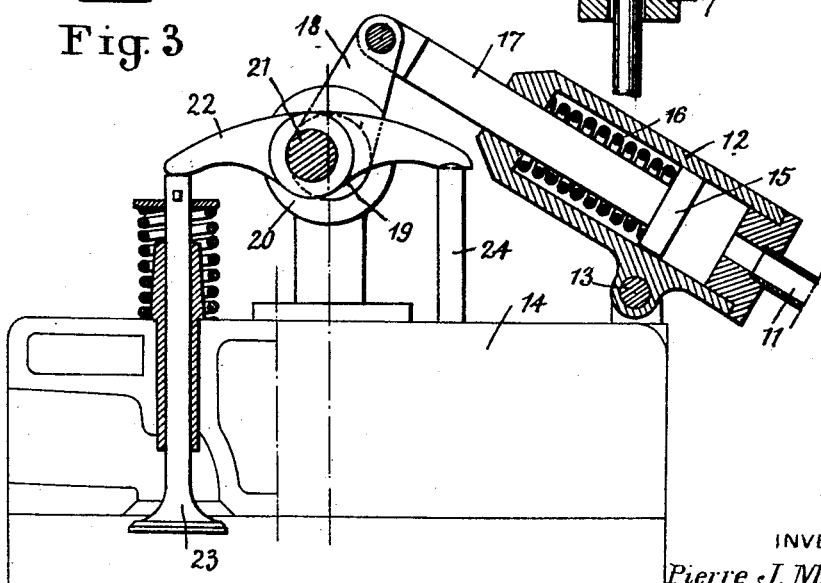
INVENTOR
Pierre J. Marchaut
BY
ATTORNEYS Patented Nov. 24, 1931

1,833,613

UNITED STATES PATENT OFFICE

PIERRE J. MARCHAUT, OF ST. DENIS, FRANCE

PRESSURE CONTROLLING MEANS FOR COMPRESSORS

Application filed April 20, 1929, Serial No. 356,769, and in France May 7, 1928.

This invention relates to a system for regulating the pressure in containers holding fluids under pressure which are fed by compressors.

In installations which work by means of a fluid under pressure and comprise for instance a compressor for air or some other gas which is forced into a reservoir, which supplies tools or instruments working intermittently, the pressure must needs be kept practically constant, notwithstanding the variations of the consumption of air due to the fact of putting the pneumatic tools in or out of service.

The system according to the invention comprises a regulating distributor mounted on the reservoir, and comprising a servo-motor constituted for instance by a spring loaded valve, preferably a ball valve, in combination with a device for unloading the compressor including, for example, a compressed air piston provided with a spring acting in opposition connected to the eccentric axis of oscillation, one or more striking levers controlling the suction valve or valves of the compressor for the purpose of effecting, in case of an increase of pressure in the reservoir, and by means of the combined action of the regulating distributor and of the piston controlling the position of the axis of the striking lever, that the suction valve of the compressor is maintained in an open position thus preventing any discharge from the compressor.

In the appended drawings which represent, as an example, an embodiment of the invention, a form of construction of the regulator for a compressed air reservoir is shown.

Figure 1 is an axial section of the distributor-regulator which is intended to be mounted on the compressed air reservoir.

Figure 2 is also a sectional view of the discharging device mounted upon the cylinder of the compressor.

Figure 3 shows the arrangement shown in Figure 2 in a discharge position, and

Figure 4 is a diagram of the apparatus as assembled.

Referring to the drawings, the regulating distributor comprises a body 1 connected to the compressed air reservoir 2 by means of a threaded socket 3 which is provided with a spherical closing valve 4 (Figure 1) maintained in position in the socket 3, by means of a tension spring 5 which can be suitably regulated and is provided with a guiding stem 6. The spring 5 is positioned in a sleeve 7 which is provided with a threaded nut 8 for adjusting the spring tension.

The chamber 9 containing the spherical valve 4 is provided with a channel 10 communicating through a pipe 11 (Figure 4) with one end of a chamber 12 which is mounted on a pivot 13 of the compressor head 14. In the interior of chamber 12 is an air tight fitting piston 15 which is acted upon by a spring 16, the piston being integral with the stem 17 to the extremity of which a crank 18 is connected. The crank 18 is integral with the shaft 19, and is seated in a bracket 20 which is also secured to the compressor head 14. The shaft 19 carries the trunnion 21 of the striking lever 22 and this trunnion is made suitably eccentric in relation to shaft 19.

The striking lever 22 which controls the suction valve 23 is actuated in a manner known per se by a member such as a push rod 24 controlled by a motor (not shown).

The apparatus functions as follows:

During normal working, that is to say, as long as the air pressure in reservoir 2 does not exceed a predetermined limit, this pressure, which acts through the socket 3 upon the loaded valve 4, is not able to overcome the resistance of the spring 6, so that the said valve 4 remains on its seat in the socket 3. The piston 15 then occupies the position indicated in Figure 2 it being pushed back by its spring 16, and the trunnion 21 of the striking lever 22 occupies a top position, so that the suction valve 23 of the compressor works normally and the compressor compresses the air into the reservoir 2 for the feed of the apparatus.

If, for instance, one or more of the apparatus fed by the reservoir 3 are stopped, the pressure in reservoir 2 will exceed the predetermined pressure, then the pressure acts upon the closing valve 4, forces that valve down by compressing the spring 5 and the valve 4 rests on its seat 25 (Figure 2). This compressed air passes through the channel 10 and the pipe 11 to the chamber 12 and forces the piston 15 into the position indicated in Figure 3, overcoming the resiliency of the spring 16 and compressing the same. The trunnion 21 of the striking lever 22 is thereby moved downwards, so that, although the valve 23 continues to be actuated by the striking lever 22, said valve 23 does not seat. The air then passes freely through the corresponding suction orifice during the run of the compressor, which thus stops delivering air into the reservoir 2.

When the pressure again becomes normal in the interior of the reservoir 2, then the action of the spring 5 again becomes preponderant and again forces the spherical closing valve 4 onto its seat in the socket 3, in the position as indicated in Figure 1. The piston 15 is pushed back by its spring 16 into the position indicated in Figure 2, the trunnion 21 of the striking lever 22 is moved into its normal working position represented in Figure 2, and the compressor again delivers compressed air into the reservoir 2.

For the purpose of avoiding interruption of the compression too frequently, the area of the orifice 25 is, preferably, made slightly larger than the area of the orifice provided in the socket 3. The air pressure then acts upon a larger surface when the ball 4 rests on the orifice 25, than when the valve is in the position shown in Figure 1, in such a manner that the ball 4 can only be brought back into the "closed" position shown in Figure 1 when the pressure in the interior of the reservoir has fallen to a value lower than that of the normal working pressure.

It is of course possible to replace the ball or spherical valve 4 by a valve clack with double bearing or by any other equivalent device. It is also possible to replace this valve 4 by a slide valve or a distributing member controlling the supply of compressed air to chamber 12, this member therefore constitutes a servo-motor which could be combined with any desired type of compressor supply device, acting in any suitable manner, for instance by closing the air inlet, by constant opening of the admission valve or valve clacks, or by any other suitable manner.

The invention is applicable to either portable or stationary compressed air plants, and is in general applicable in all cases where fluids under pressure, elastic or not, are used for the operation of any kind of device.

What I claim is:

1. In a pressure controlling system for compressors, the combination, with a fluid compressor and a reservoir normally fed thereby, of valve means connected to said reservoir and opened by excess pressure therein above a predetermined value, actuating means associated with said valve means and operable thereby upon opening of the same, a second valve associated with said compressor opened by said actuating means whereby to liberate the fluid pressure in said compressor and prevent feeding therefrom into said reservoir, auxiliary movable means operative to independently open said second valve, and eccentric means associated with said auxiliary movable means and moved by said actuating means upon operation of the latter and thereby controlling the operation of said auxiliary movable means and the extent of opening of said second valve.

2. In a pressure controlling system for compressors, the combination, with a fluid compressor having a movable push rod, a suction valve and a striking lever communicating the movements of said push rod to said suction valve, and a reservoir normally fed by said compressor, of valve means connected to said reservoir and opened by excess pressure therein above a predetermined value, actuating means associated with said valve means and operable thereby upon opening of the same, and a crank movable by said actuating means, said crank and said striking lever having a common mounting, while the axis of the striking lever is eccentric with respect to the axis of the crank, whereby movement of said crank by said actuating means is effective to alter the relative position of the axis of said striking lever.

3. In a pressure controlling system for compressors, the combination, with a fluid compressor and a reservoir normally fed thereby, of valve means connected to said reservoir and opened by excess pressure therein above a predetermined value, actuating means including a cylinder connected to said valve means and controlled thereby, a piston and a spring located in said cylinder, said spring urging said piston toward one end of said cylinder and normally balancing the fluid pressure from said valve means below a predetermined value, a second valve associated with said compressor opened by said piston upon movement thereof against said spring, whereby to liberate the fluid pressure in said compressor and prevent feeding therefrom into said reservoir, auxiliary movable means operative to independently open said second valve, and eccentric means associated with said auxiliary movable means and also moved by said piston upon movement of the latter, thereby controlling the operation of said auxiliary movable means and the extent of opening of said second valve.

4. In a pressure controlling system for compressors, the combination, with a fluid compressor having a movable push rod, a suction valve and a striking lever communicating movements of said push rod to said suction valve to open the same, and a reservoir normally fed from said compressor, of valve means connected to said reservoir and opened by excess pressure therein above a predetermined value, actuating means including a cylinder connected to said valve means and controlled thereby, a piston and an associated spring located in said cylinder, said spring urging said piston toward one end of of said cylinder and normally balancing the fluid pressure from said valve means up to a predetermined value, a second valve associated with said compressor opened by said piston upon movement thereof against said spring, whereby to liberate the fluid pressure in said compressor and prevent feeding therefrom into said reservoir, and an eccentric partly rotatable by said piston upon movement thereof and serving as an axis for said striking lever, thereby controlling the effective operation of said striking lever and the extent of opening of said second valve.

In testimony whereof I have hereunto set my hand at Paris, this eighth day of April, 1929.

PIERRE J. MARCHAUT.